(12) United States Patent
Mishra et al.

(10) Patent No.: US 10,782,981 B2
(45) Date of Patent: Sep. 22, 2020

(54) SYSTEMS AND METHODS OF DYNAMIC PORT ASSIGNMENT

(71) Applicant: Avaya Inc., Santa Clara, CA (US)

(72) Inventors: Amit Mishra, Broomfield, CO (US); Barry O'Brien, Knocknacarra (IE)

(73) Assignee: Avaya Inc., Santa Clara, CA (US)

( * ) Notice: Subject to any disclaimer, the term of this patent is extended or adjusted under 35 U.S.C. 154(b) by 161 days.

(21) Appl. No.: 15/881,311

(22) Filed: Jan. 26, 2018

(65) Prior Publication Data
US 2019/0235882 A1    Aug. 1, 2019

(51) Int. Cl.
| | |
|---|---|
| G06F 11/00 | (2006.01) |
| G06F 9/445 | (2018.01) |
| G06F 11/20 | (2006.01) |
| G06F 13/20 | (2006.01) |
| G06F 16/951 | (2019.01) |

(52) U.S. Cl.
CPC ...... *G06F 9/44505* (2013.01); *G06F 11/2017* (2013.01); *G06F 13/20* (2013.01); *G06F 16/951* (2019.01); *G06F 2201/85* (2013.01)

(58) Field of Classification Search
CPC .... G06F 9/44505; G06F 16/951; G06F 13/20; G06F 11/2017; G06F 2201/85
USPC .......................................................... 714/5.1
See application file for complete search history.

(56) References Cited

U.S. PATENT DOCUMENTS

| | | | | |
|---|---|---|---|---|
| 2012/0257529 A1* | 10/2012 | Ehara | ...................... | H04L 12/66 370/252 |
| 2014/0219167 A1* | 8/2014 | Santhanam | ....... | H04W 28/0268 370/328 |
| 2014/0226664 A1* | 8/2014 | Chen | ........................ | H04L 67/02 370/392 |
| 2014/0282784 A1* | 9/2014 | Pfeffer | ............. | H04N 21/64322 725/112 |
| 2015/0074186 A1* | 3/2015 | Hung | ...................... | H04L 47/10 709/203 |
| 2015/0370668 A1* | 12/2015 | Nazari | ................ | H04L 41/0668 714/6.3 |
| 2016/0006803 A1* | 1/2016 | Kumar | ................ | H04L 67/1091 709/203 |
| 2016/0035183 A1* | 2/2016 | Buchholz | ............ | G07F 17/3225 463/25 |

(Continued)

OTHER PUBLICATIONS

"Software system" wikipedia page, retrived from https://en.wikipedia.org/wiki/Software_system (Year: 2020).*

(Continued)

*Primary Examiner* — Yair Leibovich
(74) *Attorney, Agent, or Firm* — Sheridan Ross P.C.

(57) ABSTRACT

A system provides a listener application which can be notified about specific ports used by specific instances of a WebSocket application. A WebSocket application opens multiple dynamic ports in certain scenarios with a dynamic context. When an application is executed, a listener application is made aware of the context and port information. A system rewrites a reverse proxy configuration on the fly so that any request coming into the reverse proxy will read the change and assign the correct port. A notification to the listener is received across multiple nodes, and the configuration can be updated on all nodes based on the data provided in the configuration.

20 Claims, 9 Drawing Sheets

(56) References Cited

U.S. PATENT DOCUMENTS

2017/0099332 A1* 4/2017 Bullotta .................. H04L 69/10
2017/0180463 A1* 6/2017 Wang .................. H04L 43/0823

OTHER PUBLICATIONS

Sharma "Dynamic Port Mapping in ECS with Application Load Balancer," To the New, Jan. 24, 2017, 10 pages.

* cited by examiner

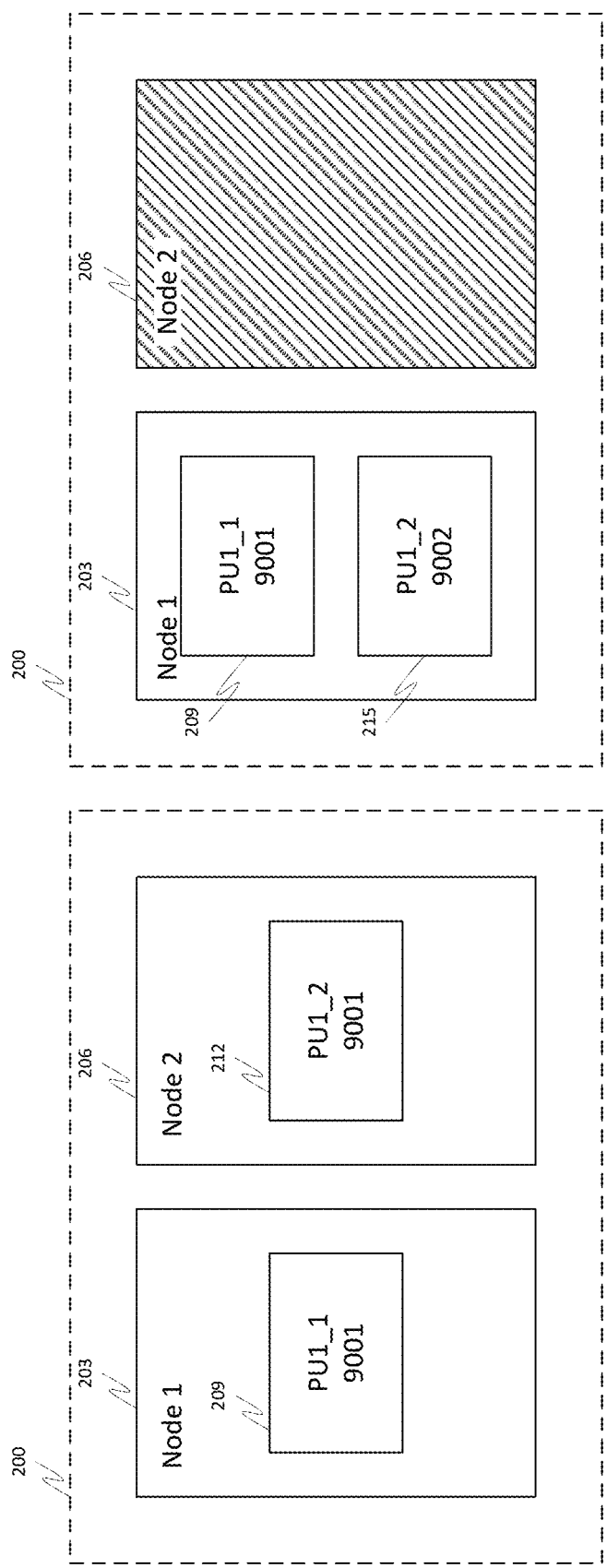

| 503 | 506 | 509 | 512 | 515 | 518 | 521 |
|---|---|---|---|---|---|---|
| Application ID | Instance ID | Network ID | Node ID | Port ID | Timestamp | ... |

| 536 | 539 | 542 | 545 | 548 | 551 | 554 |
|---|---|---|---|---|---|---|
| Application | Instance | Context | Node | Port | Timestamp | ... |
| PU1 | 1 | W | 1 | 9001 | 05.02.01.12.54.2018 | ... |
| PU1 | 2 | W | 2 | 9002 | 05.02.05.18.50.2018 | ... |
| PU1 | 3 | X | 1 | 9003 | 05.02.07.08.33.2018 | ... |
| PU2 | 1 | Y | 1 | 9004 | 05.02.09.02.04.2018 | ... |
| PU2 | 2 | Z | 1 | 9002 | 05.03.04.03.50.2018 | ... |
| PU2 | 3 | Z | 2 | 9001 | 05.03.04.13.57.2018 | ... |

| 569 | 572 | 575 | 578 |
|---|---|---|---|
| Port | Status | Timestamp | ... |
| 9001 | PU1_1 | 05.02.01.12.54.2018 | ... |
| 9002 | PU2_2 | 05.03.04.03.50.2018 | ... |
| 9003 | PU1_3 | 05.02.07.08.33.2018 | ... |
| 9004 | PU2_1 | 05.02.09.02.04.2018 | ... |
| 9005 | Available | 05.04.05.06.53.2018 | ... |
| 9006 | Available | 05.04.05.06.56.2018 | ... |

SYSTEMS AND METHODS OF DYNAMIC PORT ASSIGNMENT

FIELD

The present disclosure is generally directed to port assignment and more particularly to methods and systems for providing dynamic port assignment through a configuration rewrite.

BACKGROUND

WebSocket is a low-overhead communication protocol that allows browsers and web servers to provide communication channels. Typically, WebSocket uses Transmission Control Protocol (TCP) and uses full-duplex mode over port 80 to communicate.

With interoperability between network-based systems, there can be multiple instances on one or multiple boxes/ servers. When there are multiple instances, the port or ports may be changed from port 80. With some systems, the port on which the server starts is not known beforehand as the port is dynamically assigned. The port on the node is dynamic, and configuration may be changed based on failure, redirecting traffic.

Previously a port was statically provisioned. As of today, some network systems handle port assignment statically through a configuration for one single port, causing issues with High Availability (HA) scenarios. If the port changes, the port change would invoke a server restart. The problem may be escalated when there are load balanced nodes and one node fails.

In the past, this was not as much of a problem as there were fewer applications on a node using WebSockets and lower port usage. In the event of a failure, agent workspaces trying to connect might not get to an active node even if the ports were changed in the backend. Port changes also might result in a system restart.

As port usage increases and applications on nodes using WebSockets become commonplace in network environments, the threat of failures and system restarts becomes ever more present. The need for more efficient and dynamic port assignment systems is critical. To combat the threat of system failures and required restarts, organizations implement a large number of web servers and other web based workspace solutions. As the number of workspaces increases the number of ports being used grow in number and the increasingly large number of workspaces result in a number of issues.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates a cluster with nodes in accordance with at least some embodiments of the present disclosure;

FIG. 2B illustrates a cluster with an offline node in accordance with at least some embodiments of the present disclosure;

FIG. 5A illustrates a notification packet in accordance with at least some embodiments of the present disclosure;

FIG. 5B illustrates a database in accordance with at least some embodiments of the present disclosure;

FIG. 5C illustrates a database in accordance with at least some embodiments of the present disclosure;

DETAILED DESCRIPTION

Figure 1A:
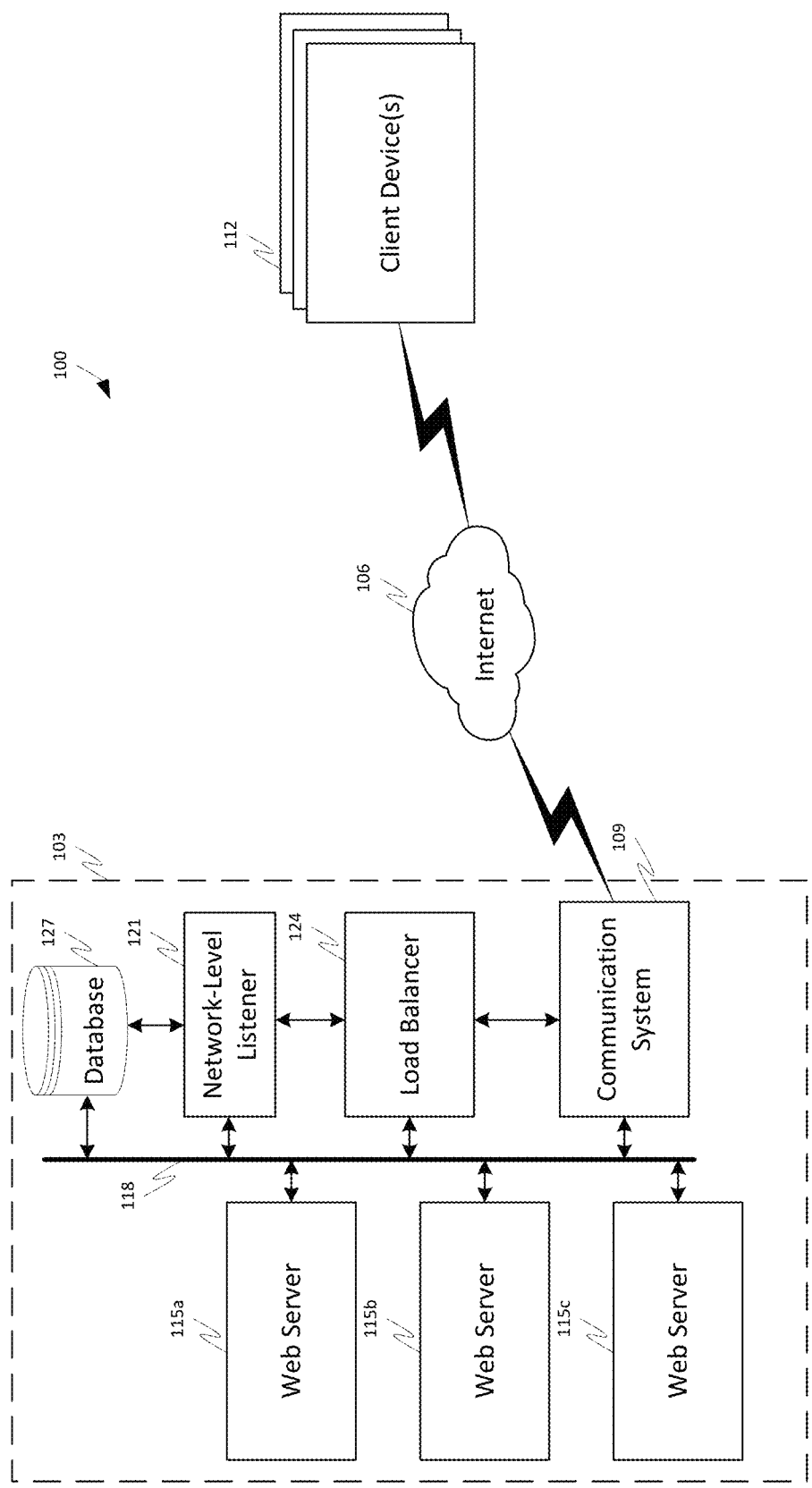
FIG. 1A illustrates a network environment in accordance with at least some embodiments of the present disclosure.

What is needed is efficient and dynamic port assignment systems. These and other needs are addressed by the various embodiments and configurations of the present invention. These and other advantages will be apparent from the disclosure of the invention(s) contained herein.

The phrases "plurality", "at least one", "one or more", and "and/or" are open-ended expressions that are both conjunctive and disjunctive in operation. For example, each of the expressions "a plurality of A, B and C", "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "data stream" refers to the flow of data from one or more, typically external, upstream sources to one or more downstream reports.

The term "dependency" or "dependent" refers to direct and indirect relationships between items.

For example, item A depends on item B if one or more of the following is true: (i) A is defined in terms of B (B is a term in the expression for A); (ii) A is selected by B (B is a foreign key that chooses which A); and (iii) A is filtered by B (B is a term in a filter expression for A). The dependency is "indirect" if (i) is not true; i.e. indirect dependencies are based solely on selection (ii) and or filtering (iii).

The terms "determine", "calculate" and "compute," and variations thereof, as used herein, are used interchangeably and include any type of methodology, process, mathematical operation or technique.

The term "item" refers to data fields, such as those defined in reports, reporting model, views, or tables in the database.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

Although the present invention is discussed with reference to WebSocket systems, it is to be understood that the invention can be applied to numerous other architectures. The present invention is intended to include these other architectures. The present disclosure provides dynamic port assignment through configuration rewrite. WebSocket dynamic port configuration is a solution where the system may use a concept of first normally assigning a starting port. When there are multiple instances on one or multiple boxes, the ports may be changed.

As illustrated in FIG. 1A, a system 100 in accordance with at least some of the embodiments may comprise an internal network 103 in communication with a wide area network (WAN) such as the Internet 106 via a communication system 109. Such a WAN connection may allow for communication with one or more client devices 112, such as personal computing devices, laptops, cell phones, smartphones, etc.

In some embodiments, the internal network 103 may comprise one or more web servers 115a-c. Each web server 115a-c may comprise a node of the internal network. Each of the one or more web servers 115a-c may be capable of interacting with one or more client devices via a WebSocket protocol. Although FIG. 1A depicts three web servers 115a-c, it should be appreciated that the system 100 may include greater or fewer web servers without departing from the scope of the present disclosure.

The internal network 103 may in some embodiments comprise an internal local area network (LAN) 118. The LAN 118 may enable/facilitate device-to-device communications within boundaries of the internal network 103. For example, the internal network 103 may comprise a communication system 109, a load balancer 124, a network-level listener 121, and a database 127, as well as the one or more web servers 115a-c.

Figure 1B:
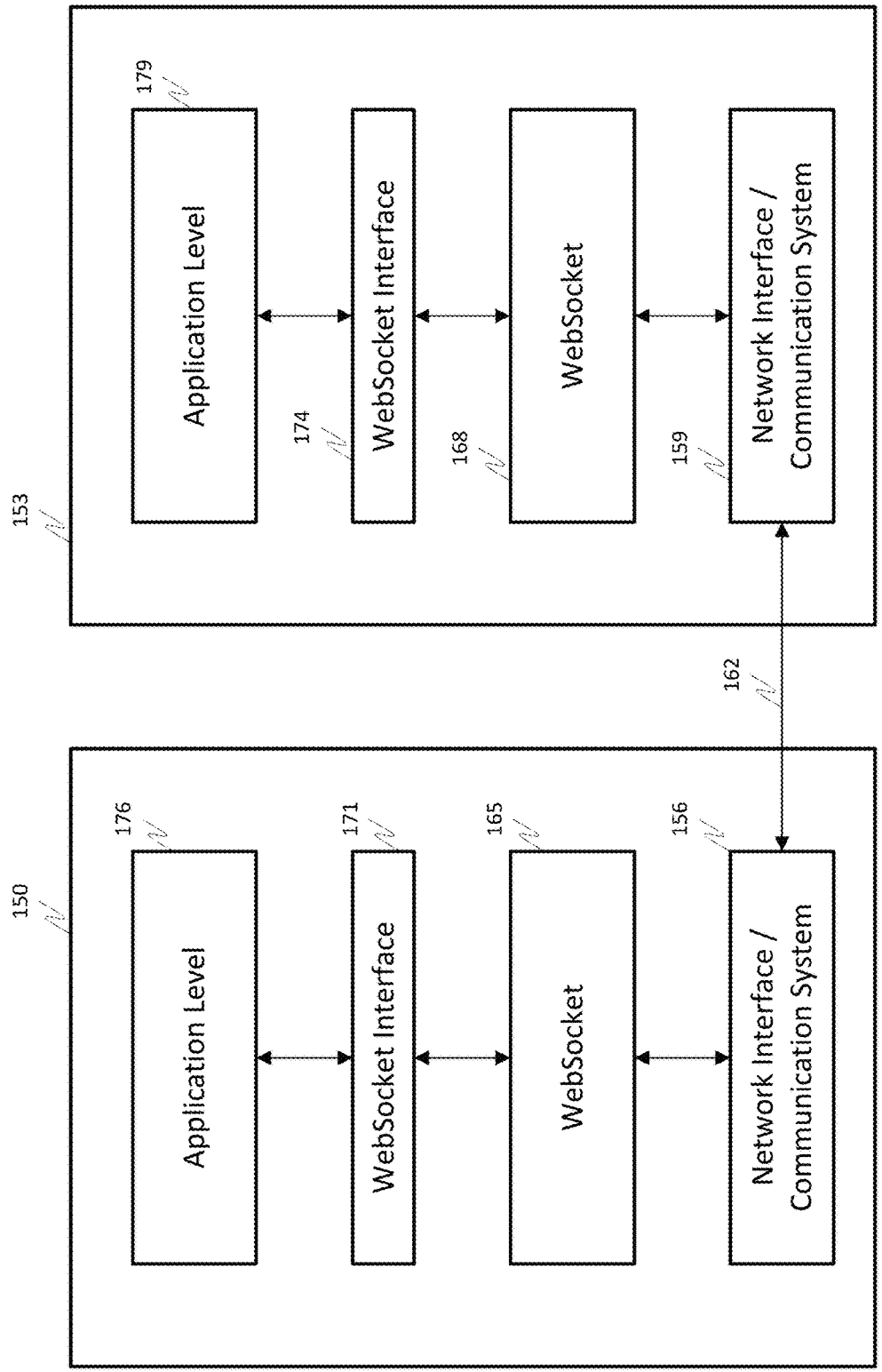
FIG. 1B illustrates a host and client device in accordance with at least some embodiments of the present disclosure.

As illustrated in FIG. 1B, a client device 153 may communicate with a web server 150 via a LAN or WAN connection 162. Each of the client device 153 and web server 150 may comprise a communication system 156, 159. Each of the client device 153 and web server 150 may further comprise a WebSocket protocol system 165, 168, and a WebSocket interface 171, 174, allowing for an application level 176, 179 of each of the client device 153 and web server 150 to communicate via WebSocket.

When an application executing at the application level 179 of a client device 153 opens a WebSocket connection with a node, or web server 150, an instance of the application is created. The instance of the application may use a specific port of the web server 150.

The disclosed system may provide a listener application which may be notified about which specific port is used by which instance of the application. One application can open multiple dynamic ports in certain scenarios with a dynamic context. When an application is executed, a listener application may be made aware of the context and port information.

The system may rewrite a reverse proxy configuration on the fly so that any request coming into the reverse proxy will read the change and assign the correct port. A notification to the listener may be received across multiple nodes, and the configuration can be updated on all nodes based on the data provided in the configuration.

As illustrated in FIG. 2A, an internal network 200 may comprise a number of web servers or nodes 203, 206. When two client devices each are executing a separate instance of an application, each separate instance may use a specific port of a node 203, 206 on the internal network 200. As illustrated in FIG. 2A, a first instance 209 (PU1_1) of an application may use port number 9001 of a first node 203, while a second instance 212 (PU1_2) of an application may use port number 9001 of a second node 206.

As an instance of an application is executed, a port may be dynamically assigned to the particular application execution instance. Such assignment may be recorded in a database in communication with the internal network by a listener device or application.

While operation of the web servers is functioning as normal, each web server or node may host a separate instance of an application. When a node goes down for any reason, as illustrated in FIG. 2B, any instance of an application operating on a port of the down node may be switched to a new port 215 of a functional node 203. The switching, or reassignment, of an instance to a new node may be detected by the listener device or application and recorded in memory.

In typical systems, such a reassignment may cause a number of issues. Because a reverse proxy of a client device may be unaware of the reassignment, traffic may not be directed to the new port. As in the example of FIG. 2B, the reverse proxy of a client device executing the second instance 215 may be aware only of port 9001 and be unaware of the new port 9002 to which the second instance 215 is reassigned.

Figures 3A, 3B:
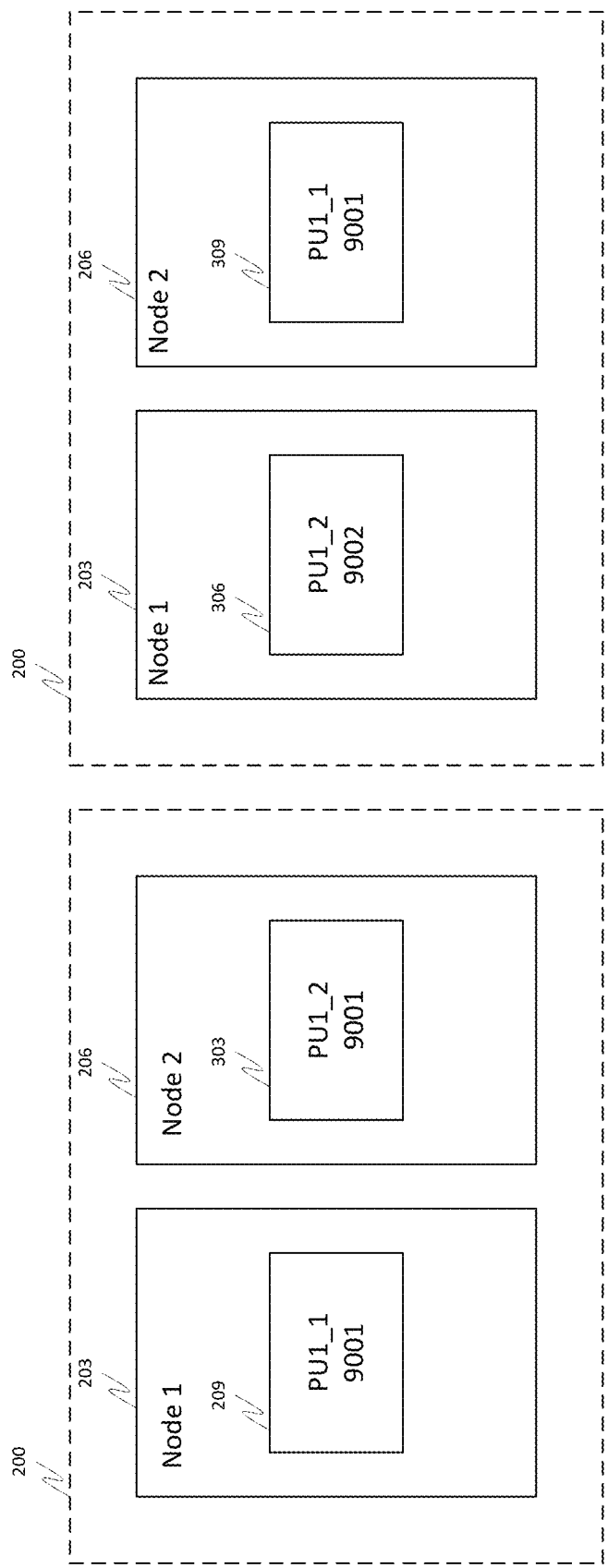
FIG. 3A illustrates a cluster possibility in accordance with at least some embodiments of the present disclosure.
FIG. 3B illustrates a cluster possibility in accordance with at least some embodiments of the present disclosure.

When the second node comes back online, as illustrated in FIGS. 3A and 3B, a rebalancing may take place. Following a rebalancing, there may be two possibilities. First, as illustrated in FIG. 3A, the second instance 303 of the application may be reassigned to port 9001 of the second node. In such a scenario, traffic may redirect and resume as normal. Second, however, as illustrated in FIG. 3B, the second instance 306 of the application may continue on port 9002 of node 1 203 while the first instance 309 may be reassigned to port 9001 of node 2 206. In such a scenario, a reverse proxy of the client device executing the second instance 306 may continue to be unaware of the reassigned port 9002 and traffic may still not be redirected to the node.

In either case, however, a listener application may be made aware of the dynamic change of the port and context. Based on this, a network-level listener device or application on the internal network may configure a reverse proxy of the respective node to appropriately direct the WebSockets and/or HTTP requests. Each node may comprise its own node-level listener device or application to record any reassignments. Each node-level listener device or application may be in communication with the network-level listener device or application and be capable of sending and receiving notifications to and from the network-level listener device or application in the event of any reassigned ports throughout the internal network.

Figure 4A:
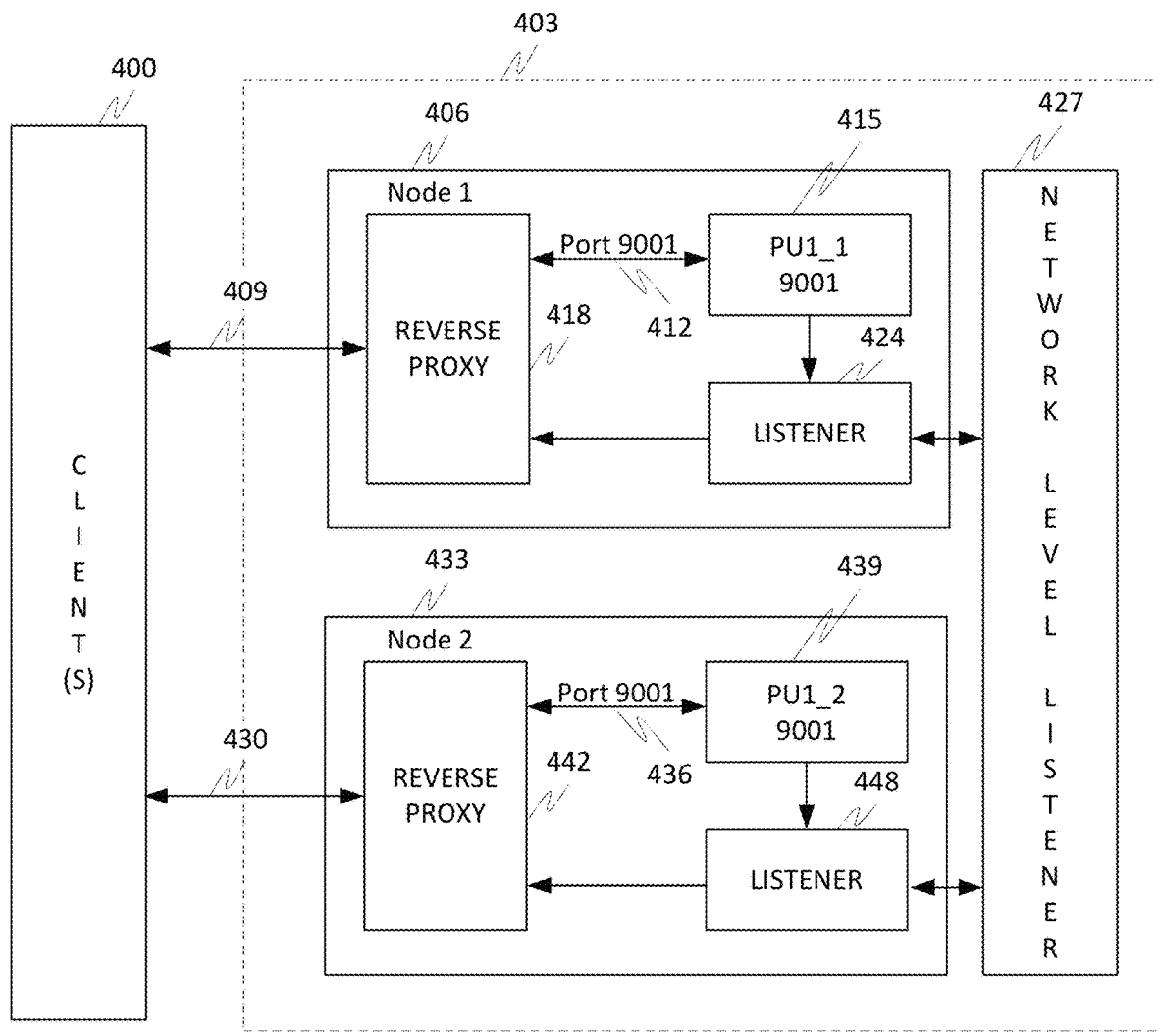
FIG. 4A illustrates a client and cluster with nodes in accordance with at least some embodiments of the present disclosure.
Figure 4B:
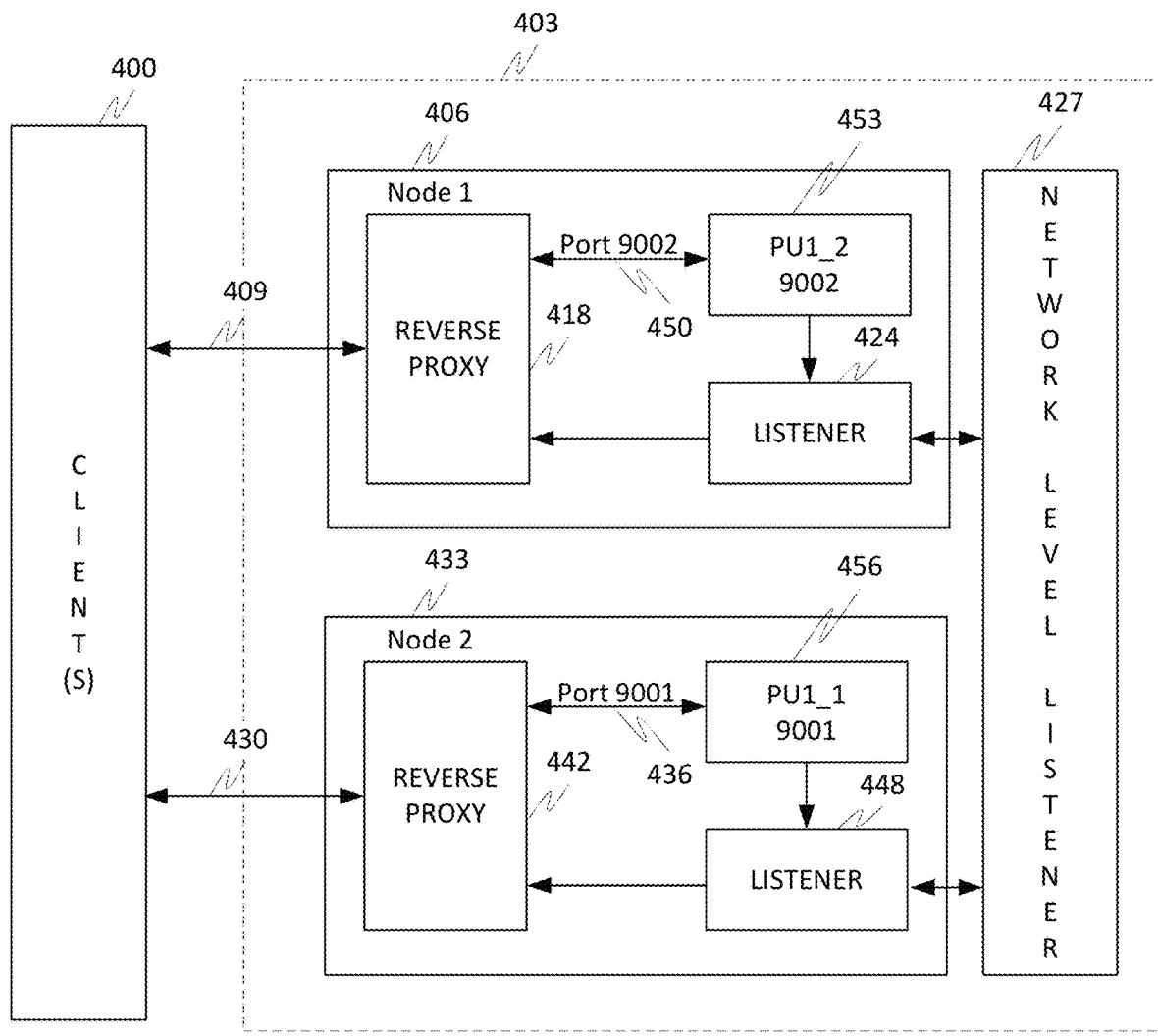
FIG. 4B illustrates a client and cluster with nodes in accordance with at least some embodiments of the present disclosure.

An illustrative system in accordance with some embodiments is depicted in FIGS. 4A and 4B. As can be appreciated, an internal network 403 may be in communication with one or more client devices 400. A client device 400 may initially connect to a common port 409, 430 (e.g. port 80 or port 443) of a particular node 406, 433 within the internal network 403.

Communication between a node 406, 433 and a client device 400 may take place via a reverse proxy 418, 442. A reverse proxy 418 may be capable of receiving an incoming packet of data from a client device 400, identify a correct port to which the incoming packet of data from the client device 400 should be directed. Such identification may be based on one or more redirect rules. Redirect rules may be updated in the reverse proxy of a particular node based on dynamic port configuration. Using such redirect rules, a reverse proxy may route WebSocket or HTTP requests to a correct port of a correct node.

Such WebSocket dynamic port configuration may solve a the high availability problem in which agent workspaces trying to connect will be able to get to a node that is still active and the changes will be recognized, even if the ports have changed in backend.

Each node 406, 433 may comprise one or more internal ports 412, 436. Each internal port 412, 436 may in some embodiments be assigned an instance of a WebSocket application. Each instance of a WebSocket may be identified by a particular identity, such as PU1_1 which may represent an application instance based on a processing unit ("PU") executing the instance as well as an instance number. For example, a first instance of an application executing on a first processing unit may be represented by PU1_1 while a second instance of an application executing on the first processing unit may be represented by PU1_2. In some embodiments, an instance may be represented by drastically varying identifiers, for example a hex code, keyword, random number, etc. In the example illustrated in FIG. 4A, a first instance PU1_1 (415) of a WebSocket application is assigned port 9001 (412) of node 1 (406) while a second instance PU1_2 (439) is assigned to port 9001 (436) of node 2 (433).

In the example illustrated in FIG. 4B, a first instance PU1_1 (456) of a WebSocket application is assigned port 9001 (436) of node 2 (433) while a second instance PU1_2 (453) is assigned to port 9002 (450) of node 1 (406).

Each node 406, 433 may comprise a listener device or application 424, 488. Each listener device or application 424, 488 of a node 406, 433 may communicate with a reverse proxy 418, 442 of the respective node 406, 433. Each listener device or application 424, 488 of a node 406, 433 may also communicate with a network-level listener.

When an instance of an application is assigned to a particular port of a particular node, a listener of the particular node may be made aware of the assignment. The listener may update a node-level registry of the new assignment. Such a change may be transmitted to one or both of the reverse proxy of the particular node and/or a network-level listener. When a network-level listener is notified of a new assignment or a reassignment of an instance of an application to a port of a node, the network-level listener may update a network-level registry of the new assignment or reassignment.

An example notification data packet 500 which may be sent between a node-level listener, a network-level listener, and/or a reverse proxy is illustrated in FIG. 5A. As can be appreciated, such a data packet 500 may comprise fields corresponding to one or more of an application identifier ("ID") 503, an instance ID 506, a network ID 509, a node ID 512, a port ID 515, a timestamp 518 and/or other information 521. Other information 521 may comprise information such as a context of the assignment or reassignment. Context may comprise information such as whether the assignment is due to an instance of an application originating on the network or whether the assignment is due to an instance of an application being reassigned due to a down node. In some embodiments, identifying information such as application ID, node ID, etc. may be presented in the form of a URL.

A network-level registry 533 may be as illustrated in FIG. 5B. Such a network-level registry 533 may comprise a number of entries. In some embodiment, there may be an entry in the network-level registry for each port in the network. In some embodiments, there may be an entry in the network-level registry for each instance of each application operating on the network. A network-level registry may comprise fields corresponding to data such as an application ID 536, an application instance ID 539, a context of the assignment 542, a node ID 545, a port ID 548, a timestamp 551, and/or other information 554.

A node-level registry 566 may be as illustrated in FIG. 5C. A node-level registry 566 may comprise information such as port ID 569, status indicator 572, a timestamp 575, and/or other information 578.

When an instance of an application originates, systems and methods of the disclosed system may be operable to assign a first port to the instance based on available ports on the internal network. Such an assignment may be made at the network-level, based on a network-level port registry.

Node level reverse proxies may be notified of the assignment and may be capable, upon receiving a data packet from a client device executing the application, of directing the data packet to the proper port of the proper node. If a failure of a node occurs, the disclosed system and methods may be capable of triggering a dynamic WebSocket port change based on the failure and/or the number of instances in use.

Figure 6:
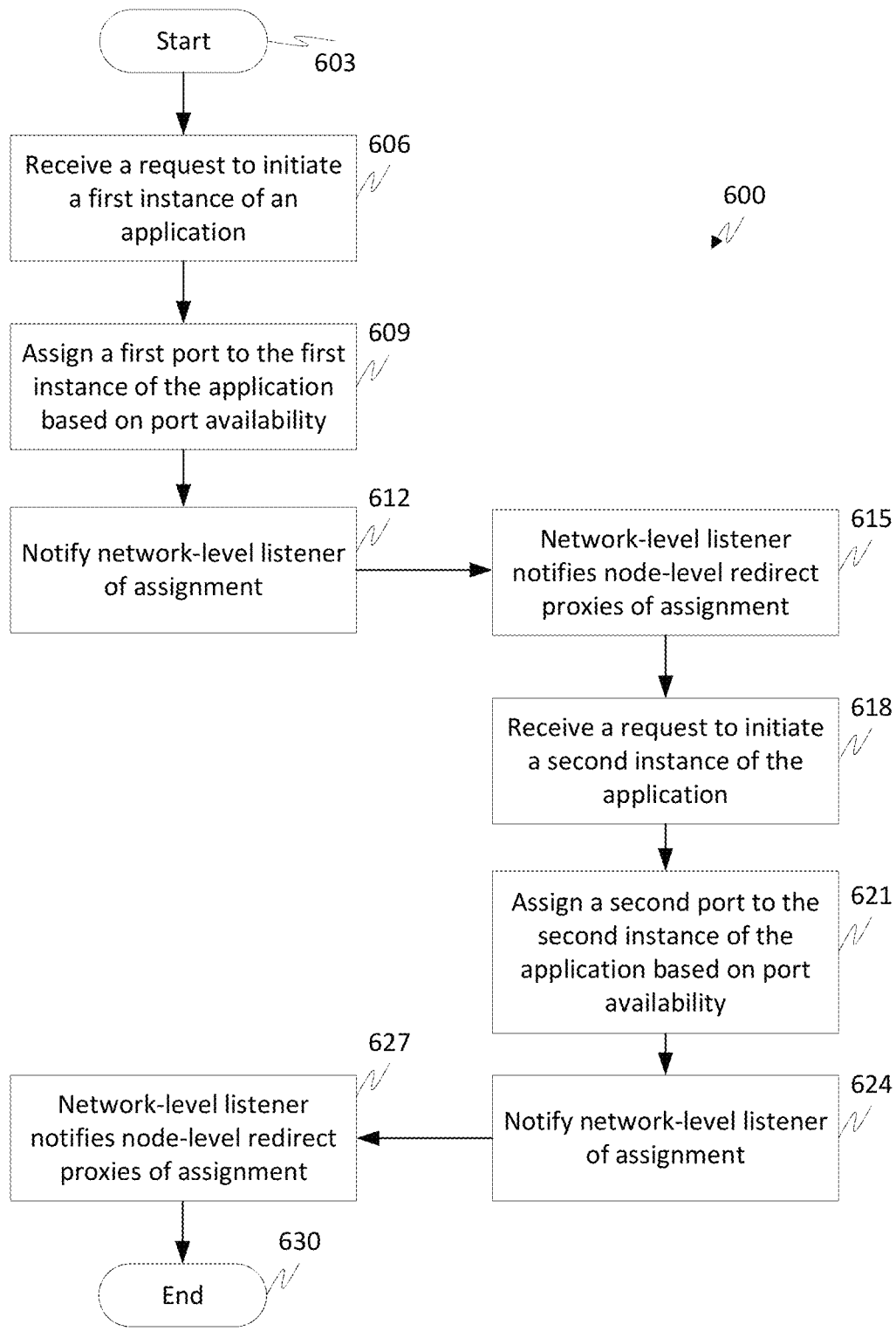
FIG. 6 is a flowchart of a method in accordance with at least some embodiments of the present disclosure.

FIG. 6 is a flowchart of a method 600 for dynamically configuring WebSocket ports in accordance with at least some embodiments of the present disclosure. In the beginning stage 603 of the method 600, each reverse proxy of each node may be aware of all port assignments across the internal network.

At step 606, when a reverse proxy of a particular receives a request from a client device for a first instance of a web socket application, the reverse proxy may determine an available port and assign the first instance to the determined available port 609. The assignment may be recorded by the reverse proxy of the node and the reverse proxy may begin directing data directed to the first instance to the determined port. Data associated with the assignment of the port may be sent to the network-level listener 612 which may send along the new assignment to other node-level listeners 615. As a result, data directed to the first instance of the application may be redirected to the proper node and port regardless of which node receives the data.

At step 618, when a reverse proxy of a particular receives a request from a client device for a second instance of a web socket application, the reverse proxy may determine an available port and assign the second instance to the determined available port 621. The assignment may be recorded by the reverse proxy of the node and the reverse proxy may begin directing data directed to the second instance to the determined port. Data associated with the assignment of the port may be sent to the network-level listener 624 which may send along the new assignment to other node-level listeners 627. As a result, data directed to the second instance of the application may be redirected to the proper node and port regardless of which node receives the data.

Figure 7:
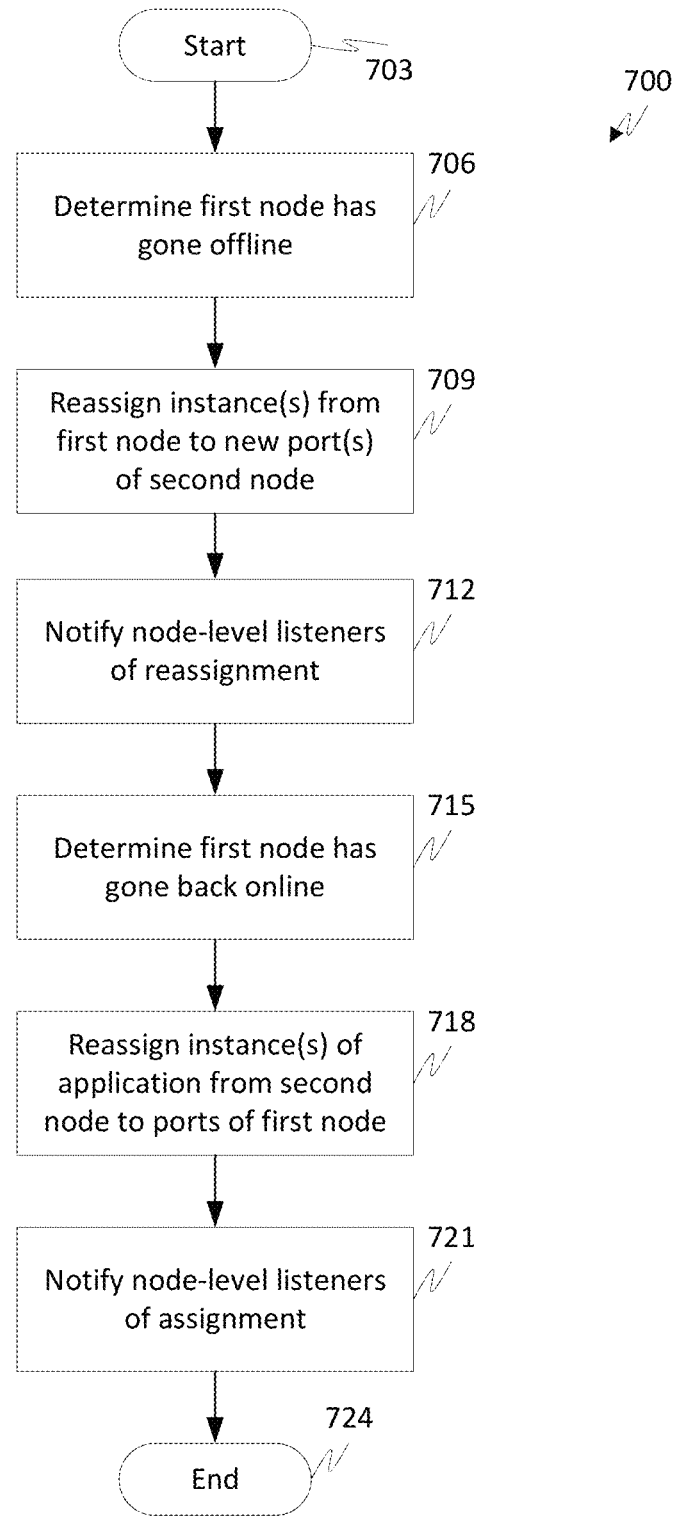
FIG. 7 is a flowchart of a method in accordance with at least some embodiments of the present disclosure.

In some embodiments, a system may be capable of dealing with one or more nodes failing or otherwise going offline as illustrated in the method 700 flowchart of FIG. 7. In the beginning stage 703 of the method 700, each reverse proxy of each node may be aware of all port assignments across the internal network. At step 706, the network-level listener may become aware of a failure of a first node. The network-level listener may determine the first node has failed in a number of ways. For example, the network-level listener may occasionally poll node-level listeners for updated registries. If one node-level listener is non-responsive, the network-level listener may determine the associated node is offline.

After determining a first node is offline, in step 709 the network-level listener may reassign any instances which were assigned to ports on the first node to ports of other nodes. The network-level listener may record such reassignments in an internal registry. In step 712, node-level listeners across the network may be made aware of the reassignment by receiving the updated registry sent by the network-level listener.

After reassigning the instances to an online node, and notifying node-level listeners across the network of the reassignment, the operation of the WebSocket system may continue normally. During operation in the event that a node is offline, the network-level listener may continuously or occasionally poll the offline node waiting for the offline node to come online. Eventually the network-level listener may determine the first node has gone back online at step 715. When the first node is back online, the network-level listener may effectively rebalance the network by reassigning a number of instances of applications from overloaded nodes to the recently offline node in step 718. Such reassignment may be recorded in a network-level registry by the network-level listener and the updated registry may be sent to node-level listeners in step 721. With the updated registry, the WebSocket system may continue normally at step 724.

The exemplary systems and methods of this invention have been described in relation to a network environment. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the data stream reference module is applied with other types of data structures, such as object oriented and relational databases.

In another alternative embodiment, the data stream reference module is applied in architectures other than contact centers, such as workflow distribution systems.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim.

Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for dynamically configuring WebSocket ports, the method comprising:
assigning, by a processor, a first port of a plurality of ports to a first instance of an application;
distributing, by the processor, a first notification to one or more listener applications, wherein the first notification comprises information associated with the assignment of the first port to the first instance of the application;
determining, by the processor, that a second instance of the application exists;
assigning, by the processor, a second port of the plurality of ports to the second instance of the application;
distributing, by the processor, a second notification to the one or more listener applications;
determining, by the processor, that a first node has failed; and
dynamically reassigning ports associated with the first node to a second node dependent upon a number of instances of the application.

2. The method of claim 1, wherein the second notification further comprises a context of the assignment of the second port to the second instance of the application.

3. The method of claim 1, wherein distributing the second notification comprises distributing, by the processor, the second notification across two or more nodes.

4. The method of claim 3, wherein each one of the two or more nodes comprises a database listing data associated with port assignments.

5. The method of claim 1, further comprising redirecting, by the processor, a WebSocket request from a client to a port based on a database of port assignments.

6. The method of claim 1, wherein data associated with the dynamically reassigned ports is sent to a network-level listener.

7. The method of claim 1, further comprising determining, by the processor, the first node is back online.

8. The method of claim 7, further comprising, in response to determining the first node is back online, reassigning the dynamically reassigned ports back to the first node.

9. A computer system comprising:
a processor; and
a memory coupled to the processor and comprising non-transitory computer-readable program code that, when executed by the processor, causes the processor to perform operations comprising:
assigning, by the processor, a first port of a plurality of ports to a first instance of an application;
distributing, by the processor, a first notification to one or more listener applications, wherein the first notification comprises information associated with the assignment of the first port to the first instance of the application;
determining, by the processor, that a second instance of the application exists;
assigning, by the processor, a second port of the plurality of ports to the second instance of the application; and
distributing, by the processor, a second notification to the one or more listener applications, wherein the second notification comprises information associated with the assignment of the second port to the second instance of the application;
determining, by the processor, that a first node has failed; and
dynamically reassigning ports associated with the first node to a second node dependent upon a number of instances of the application.

10. The system of claim 9, wherein the second notification further comprises a context of the assignment of the second port.

11. The system of claim 9, wherein distributing the second notification comprises distributing, by the processor, the second notification across two or more nodes.

12. The system of claim 11, wherein each one of the two or more nodes comprises a database listing data associated with port assignments.

13. The system of claim 9, wherein data associated with the dynamically reassigned ports is sent to a network-level listener.

14. The system of claim 9, further comprising determining, by the processor, the first node is back online.

15. A computer program product comprising:
a non-transitory computer-readable storage medium having computer-readable program code embodied therewith, the computer-readable program code configured, when executed by a processor, to:
assign, by the processor, a first port of a plurality of ports to a first instance of an application;
distribute, by the processor, a first notification to one or more listener applications, wherein the first notification comprises information associated with the assignment of the first port to the first instance of the application;
determine, by the processor, that a second instance of the application exists;
assign, by the processor, a second port of the plurality of ports to the second instance of the application;
distribute, by the processor, a second notification to the one or more listener applications, wherein the second notification comprises information associated with the assignment of the second port to the second instance of the application;
determine, by the processor, that a first node has failed; and
dynamically reassigning ports associated with the first node to a second node dependent upon a number of instances of the application.

16. The computer program product of claim 15, wherein the second notification further comprises a context of the assignment of the second port.

17. The computer program product of claim 15, wherein distributing the second notification comprises distributing, by the processor, the second notification across two or more nodes.

18. The computer program product of claim 17, wherein each one of the two or more nodes comprises a database listing data associated with port assignments.

19. The computer program product of claim 15, wherein data associated with the dynamically reassigned ports is sent to a network-level listener.

20. The computer program product of claim 15, further comprising determining, by the processor, the first node is back online.

* * * * *